Dec. 15, 1942.　　　G. G. MERCHEN　　　2,305,484
SCALE CONVEYER STRUCTURE
Filed April 3, 1940　　　2 Sheets-Sheet 1
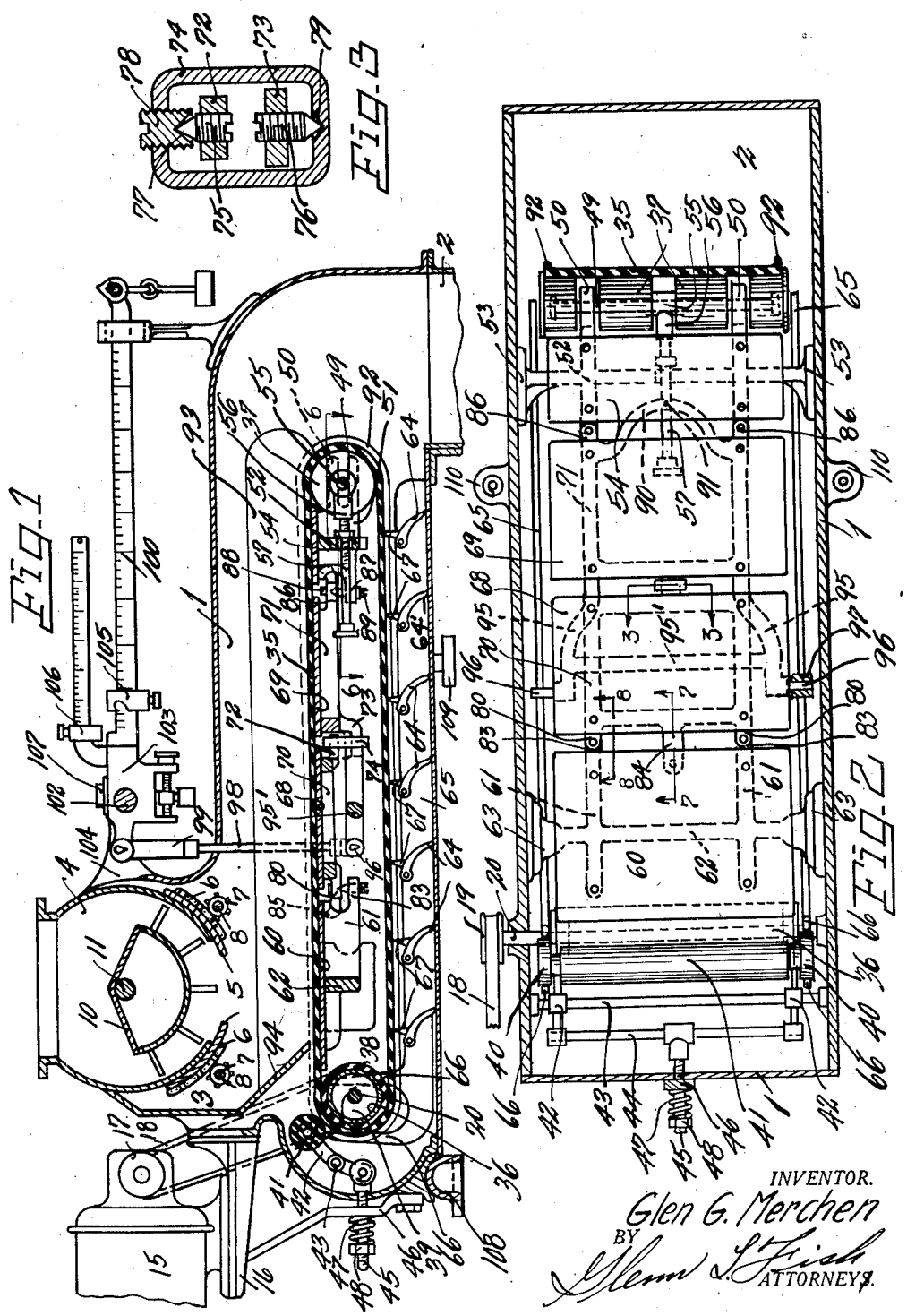
INVENTOR.
Glen G. Merchen
BY
ATTORNEYS Dec. 15, 1942.        G. G. MERCHEN        2,305,484
SCALE CONVEYER STRUCTURE
Filed April 3, 1940        2 Sheets-Sheet 2
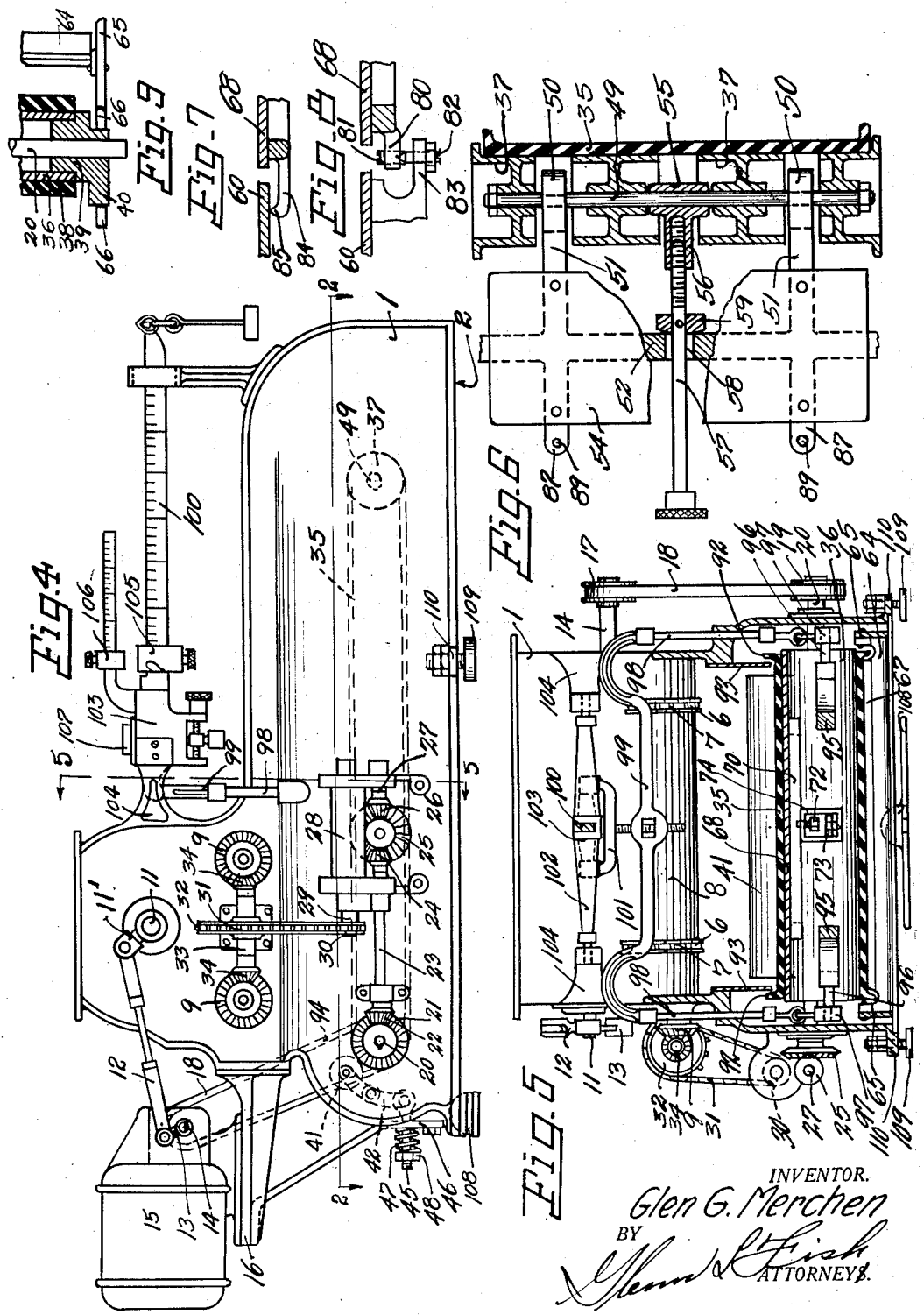
INVENTOR.
Glen G. Merchen
BY
ATTORNEYS.

Patented Dec. 15, 1942

2,305,484

UNITED STATES PATENT OFFICE 2,305,484

SCALE CONVEYER STRUCTURE

Glen G. Merchen, Spokane, Wash.

Application April 3, 1940, Serial No. 327,613

6 Claims. (Cl. 198—39)

This invention relates to scales for weighing a continuously flowing stream of flour, grain, or other material and it is one object of the invention to provide a scale wherein the flour or other material passes from a hopper onto an endless conveyer moving at a predetermined rate of speed over a scale platform having balancing means associated therewith for evenly balancing the platform when a predetermined weight of material is supported by the platform and the conveyer belt passing over the same, there being also provided gates for the outlet of the hopper and means actuated by vertical movement of the platform to open and close the gates and regulate the flow of material from the hopper and thus maintain an even weight of material upon the conveyer.

Another object of the invention is to provide a scale of this type wherein an improved belt is employed as means for moving the material across the scale platform, the belt being of rubber or other suitable material powdered by friction or other suitable means.

Another object of the invention is to provide means for applying pressure to the belt over one of the rollers which is faced with rubber and thus eliminates any danger of the belt slipping, means being provided for urging the pressure roller towards the belt and means being also provided for adjusting the tension of a spring by means of which the pressure roller is urged toward the belt.

A further object of the invention is to provide a means for urging a loaded conveyer belt across the scale platform without exerting a tension thereon.

A further object of the invention is to provide improved scrapers for removing material from the under flight of the conveyer belt during operation of the scale, the scrapers being actuated by cams turning with the driving roller about which the belt passes.

Still another object of the invention is to provide an improved arrangement of platform sections counterbalanced by the scale beam and the weight carried thereby, the platform sections being so associated with each other that they move in unison in response to the weight of the material carried by the conveyer belt.

A further object of the invention is to provide a stationary receiving platform of sufficient size to permit the material being weighed to settle before reaching the scale platform and a stationary delivery platform spaced sufficiently from the scale platform to prevent a run off of material before it is weighed.

Another object of the invention is to provide a scale having automatic control means to maintain the scale in the same weighing position for all amounts of material being weighed.

Another object of the invention is to provide a scale platform having supporting means and a central weighing pivot point held in suspension by a swivel yoke.

And the invention has as a still further object to provide a scale of this character which is comparatively simple in construction, very accurate, and not liable to get out of order.

The invention is illustrated in the accompanying drawings, wherein:

Figure 1 is a vertical sectional view taken longitudinally through the scale.

Fig. 2 is a horizontal sectional view taken longitudinally through the scale on the line 2—2 of Fig. 4.

Figure 3 is a fragmentary sectional view on an enlarged scale, taken vertically through a link connecting one section of the scale platform with another.

Figure 4 is a side elevation of the improved scale.

Figure 5 is a transverse section on the line 5—5 of Fig. 4.

Figure 6 is a fragmentary sectional view on the line 6—6 of Fig. 1.

Figure 7 is a fragmentary sectional view of the line 7—7 of Fig. 2.

Figure 8 is a similar view on the line 8—8 of Fig. 2.

Figure 9 is a fragmentary sectional view taken horizontally through one end portion of the drive roller for the conveyer belt.

This improved scale has a hollow base or housing I formed adjacent one end of its bottom with an outlet from which a spout 2 extends. A throat 3 extends upwardly from adjacent the other end of the housing and in this throat is a hopper 4 having an outlet at its bottom. Flow of flour or other material through the outlet of the hopper is controlled by gates 5 which are slidably mounted and provided with racks 6 with which mesh pinions 7 carried by rotatably mounted shafts 8. These shafts are mounted transversely of the base or housing with their ends protruding from one side thereof and carrying beveled gears 9. Within the hopper is an agitator 10 having a shaft 11 extending through and journaled in walls of the hopper. An arm or crank 11' is mounted on the shaft 11 and connected to a pitman link 12. This pitman has its other end pivoted to the crank 13 carried by the shaft 14 of the motor 15 which is supported on the shelf 16. It will readily be understood that during rotation of the motor shaft, reciprocating motion will be imparted to the pitman and oscillating motion transmitted to the agitator. At the other end of the motor shaft is a pulley 17 about which is trained a belt 18 having its lower portion engaged about a pulley 19 carried at one end of a shaft 20 which is rotatably mounted through the base or housing and at its other end carries a beveled gear 21 meshing with a beveled pinion 22 carried by a shaft 23. The shaft 23 is rotatably mounted longitudinally of the housing at one side thereof and at its other end carries a beveled pinion 24 meshing with a larger beveled gear or pinion 25. This gear is also in mesh with a pinion 26 carried by a shaft 27 which is rotated in a direction opposite to that in which the shaft 23 turns and above these shafts is a solenoid-controlled clutch 28 by means of which rotary motion is transmitted to the shaft 29.

When the solenoid is energized by movement of the scale platform, as will hereinafter be explained, rotary motion will be imparted to the shaft 29 either from the shaft 23 or shaft 27, and the shaft 29 caused to turn in a predetermined direction. The shaft 29 carries a sprocket 30 about which is trained a sprocket chain 31 extending upwardly therefrom and trained about a larger sprocket 32 carried by a shaft 33 which extends longitudinally of the housing and carries beveled pinions 34 meshing with the beveled gears 9. When the shaft 33 is turned in one direction, the gates 5 will be opened and when the shaft is turned in the opposite direction, the gates will be shifted toward closed position. Opening and closing of gates controls the flow of material from the hopper and since opening and closing of the gates is responsive to action of the solenoid clutch, the material will be fed from the hopper at the proper rate of speed for accurate operation of the scale.

In order to move the material toward the discharge spout, there has been provided an endless conveyer consisting of a belt 35 formed of rubber and trained over rollers 36 and 37. The roller 36, which constitutes a driving roller for the belt 35, is provided with a rubber sheath or jacket 38 in order that good frictional engagement with the belt will be provided. The heads 39 of the roller 36 are fixed on the shaft 20 so that this roller is rotated with the shaft and, upon referring to Figs. 2 and 9 of the drawings, it will be seen that the heads 39 are provided with an eccentric extension 40 constituting cams serving a purpose to be hereinafter set forth. Close contacting engagement between the rubber belt and the rubber sheath of roller 36 must be assured in order that there will be no danger of slippage between the belt and the roller during driving of the belt. To accomplish this, there has been provided a pressure applying roller 41 rotatably mounted over the roller 36 between arms 42 which are pivotally mounted on a rod or shaft 43 and have their outer ends connected by a rod 44 having a stem 45 extending therefrom through the front end of the housing 1 and through a bracket 46 serving as a brace or prop for the shelf 16 carrying the motor 15. A spring 47 is confined between the bracket and a nut 48 which is threaded on the stem or shank 45, and it will be readily understood that by adjusting the nut, tension of the spring may be regulated and the arms 42 rocked on the shaft or rod 43 to control the pressure exerted on the belt over the roller 36. Therefore, the belt will be firmly held against the rubber jacket or sheath of the driving roller and the belt will be driven without slippage occurring.

The pressure exerted between the two rollers causes the belt to be urged or pushed across the scale platform permitting the slack in the belt to float with the scale platform in a vertical movement.

The rollers 37 are rotatably mounted through the medium of a shaft 49 which is supported in the forks 50 at rear ends of arms 51 carried by a cross bar 52 extending transversely through the base or casing 1 and having heads 53 at its ends which are firmly secured against side walls of the casing. The cross bar 52 and the arms or side bars 51 constitute a supporting frame for a stationary rear plate 54 over which the upper flight of the belt passes.

The plate 54 is spaced from the platform scale and extends sufficient in length to support the material until it is sufficiently weighed before leaving the conveyer. A bearing 55 fits loosely about the shaft 49 midway the length thereof and carries a forwardly projecting internally threaded sleeve 56 in which is engaged the threaded end of an adjusting stem 57 which passes through an opening 58 formed in the cross bar 52 and carries a collar 59 bearing against the rear face of the cross bar. By turning the stem the shaft 49 will be shifted longitudinally in the forks 50 and the belt properly tightened.

A forward plate 60 which constitutes a stationary support for the forward portion of the upper flight of the conveyor belt is mounted on a frame having arms or side bars 61 carried by a cross bar 62 extending transversely in the casing 1 and having heads 63 at its ends which are firmly secured against side walls of the casing. This plate is located under the hopper and since the plate is stationary the flour or other material may drop upon the conveyer belt without causing the vertical movement which would disturb the balance of the scale. The plate 60 or stationary platform provides for the fall of the material from the hopper and extends toward the scale sufficient in length to support the material until it is settled before moving onto the scale.

During operation of the scale, a certain amount of the material has a tendency to adhere to the belt and in order that this material may be removed from the belt and shifted along the bottom of the casing to the discharge spout, there have been provided scrapers 64 which extend transversely in the base under the conveyer and are pivotally mounted between strips 65 extending longitudinally in the casing at sides thereof. These strips have their front ends formed with upstanding arms or fingers 66 between which fit the cams 40, and from an inspection of Figs. 2 and 9, it will be readily seen that during rotation of the drive roller 36, the strips 65 move back and forth along the bottom of the casing and the upper edge of their auxiliary blades 67 will have scraping engagement with the lower flight of the conveyer belt. Therefore, any of the powdered material adhering to the belt will be scraped off and as it drops onto the bottom of the casing it will be engaged by lower edges of the scrapers and progressively shifted along the casing until it reaches the discharge spout into which it passes. It will thus be seen that the powdered material will only pass through the scale once and will be accurately weighed. In view of the fact that the scrapers have rounded surfaces 64' back of their lower edges, as shown in Fig. 1, and the belt is flexible, the scapers may tilt about their pivots and slide over material on the bottom of the casing as they move away from the outlet. The weight of the belt and the fact that the auxiliary blades are offset forwardly of the pivots for the blades, causes the scrapers to be held firmly against the bottom of the casing as the scrapers move toward the outlet. Therefore, the material will only pass through the scale once and it will be accurately weighed.

Front and rear floating scale plates 68 and 69 occupy space between the front and rear stationary plates. These plates are carried by front and rear frames 70 and 71 which have their adjoining ends formed with tongues 72 and 73 which extend through a yoke 74 and carry threaded pivot pins 75 and 76, the pin 75 being engaged in a recess 77 formed in the inner end of a bearing 78 and the pin 76 being engaged in a recess 79 formed at the lower end of the yoke. At its front end, the frame 70 carries at its sides forwardly projecting arms or tongues 80 carrying bearings 81 engaged by pivot pins 82 which are threaded through arms or tongues 83 which project rearwardly from the side bars 61 of the frame carrying the front plate 60. Intermediate its width the frame 70 carries a forwardly extending tongue or arm 84 terminating in upwardly extending pivot 85 spaced sufficiently from the plate 60 so that it will not interfere with sensitiveness of the scale. The frame 71 carrying the rear floating plate 69 is also provided with arms or tongues 86 which overhang tongues 87 projecting forwardly from the arms 51 of the frame carrying the rear stationary plate 54 and are formed with bearings 88 corresponding to the bearings 81 and engaged by the pivot pins 89 extending upwardly from the tongues 87. The rear bar 90 of the frame 71 is curved rearwardly under the plate 54 and provided with an upstanding pivot point 91. Pivot points 85 and 91 are spaced from the plates 54 and 60 sufficient distance to prevent interference of the scale but sufficiently close to prevent the scale platforms from becoming dislodged from the four supporting pivots. It should be noted that the conveyer belt is formed with side flanges 92 which overlap lower side edges of the side boards 93 extending from the deflector plate 94 of the hopper. These side strips or boards 93 serve to prevent the material from spilling from side edges of the belt as it is moved through the casing 1 from the hopper and dumped into the discharge spout.

Scale arms 95 which are braced by a cross bar 95, extend from opposite sides of the inner end of the frame 71. These arms are curved longitudinally, as shown in Fig. 2, and terminate in outstanding pintles 96 pivotally mounted through bearing blocks 97 at lower ends of rods 98 extending downwardly from ends of a cross bar or yoke 99. The yoke or cross bar 99 is pivotally suspended from the inner end of a scale beam 100 by a hanger 101, and upon referring to Figs. 1 and 4, it will be seen that the scale beam extends longitudinally of the casing 1 in a vertical spaced relation thereto and adjacent its inner end carries pivot bars 102 which project from opposite sides of the block 103 of the scale beam and are pivotally engaged with the bearing brackets 104 extending rearwardly from the hopper at opposite sides thereof. In view of the fact that the floating plates 68 and 69 are carried by frames 70 and 71 which are pivotally mounted at their outer ends and inter-connected by the arms 72 and 73 and the yoke or loop 74, the weight of the material carried by the conveyer belt will depress the plates and their supporting frames and downward pull will be exerted upon the rods 98 and the cross arm or bar 99 and the scale beam will be rocked about its pivots and if the material is being delivered at the proper rate of speed to balance the scale beam, a predetermined quantity of material will be delivered to the discharge spout within a predetermined time. The quantity of material thus passed through the machine is recorded on an automatic recording machine not shown. Since vertical movement of the scale beam actuates the switch of the solenoid clutch 28 and movement of the scale beam is responsive to movements of the floating plates, the gates 5 will be opened or closed if the proper quantity of material is not being delivered from the hopper onto the conveyer belt. The fact that the material drops upon the conveyer over the forward stationary plate instead of upon a floating plate, prevents undesired vibrations which would be liable to transmit movement to the scale beam and prevent accurate operation of the weighing machine. The weights 105 and 106 will, of course, be adjusted to set the scale for causing a predetermined weight of material to be supported by the floating plates. A level 107 is mounted over the block of the scale beam and, in order that the machine may be supported upon a base in a level position, there have been provided front and rear feet 108 and 109, the front foot being located midway the width of the casing and permitting universal tilting movement and the rear feet being threaded through ears 110 projecting from opposite sides of the bottom of the casing and adjustable through the same so that the casing may be shifted vertically or tilted transversely until the bubble of the level is properly centered.

Having thus described the invention, what is claimed is:

1. In a weighing apparatus, a casing having an inlet adjacent its front end and an outlet adjacent its rear end, a scale beam pivotally mounted over said casing, front and rear stationary platforms in said casing, front and rear weighing platforms between the stationary platforms pivoted to the stationary platforms and to each other, the rear weighing platform having forwardly extending arms at its sides, a yoke suspended from said scale beam and extending transversely over the casing; links extending vertically through side portions of said casing with their upper ends carried by said yoke and their lower ends provided with bearings pivotally supporting the arms of the rear weighing platform, and a belt conveyer for moving material through the casing between the inlet and the outlet having its upper flight resting on the platforms.

2. In a weighing apparatus, a casing having an inlet adjacent its front end and rear outlet, a scale beam over said casing pivotally mounted adjacent one end, front and rear weighing platforms in said casing, supporting frames for said platforms pivotally mounted and at their adjacent ends provided with vertically spaced, overlapping tongues, pivot pins carried by said tongues, a band extending about said tongues and having sockets receiving ends of said pins, one socket being adjustable through the band, arms extending forwardly from opposite sides of the rear frame, a yoke suspended from said scale beam transversely over said casing and having depending rods at its ends slidably entering the casing, bearings at the lower ends of said rods pivotally supporting the front ends of the arms of the rear frame, and a conveyer in said casing extending longitudinally therein between the inlet and the outlet including an endless belt having its upper flight resting on the scale platforms.

3. In a weighing apparatus, a casing having an inlet adjacent its front end and a rear outlet, a scale beam over said casing pivotally mounted adjacent one end, a weighing platform in said casing, a supporting frame for said platform pivotally mounted and adapted to have pivotal movement when the weighing platform is depressed by weight of material thereon, a yoke suspended from the scale beam and having depending rods extending into the casing and connected with the frame to yieldably support the frame, a conveyer extending longitudinally in said casing between the inlet and outlet and including an endless conveyer belt having its upper flight resting on said platform, rollers for said belt, one roller constituting a drive roller and having a drive shaft, and scraper means actuated from said drive shaft for scraping material from the lower flight of said belt and moving the same along the bottom of the casing into the outlet.

4. In a weighing apparatus, a casing having an upper inlet at its front end and a lower outlet at its rear end, a scale beam over said casing pivotally mounted adjacent one end, front and rear stationary platforms in said casing having supporting frames rigidly mounted in the casing under the inlet and adjacent the outlet, front and rear weighing platforms between the stationary platforms having frames provided with side bars pivotally supported upon frames of the stationary platforms, extensions at ends of the frames of the weighing platforms extending under adjacent ends of the stationary platforms and pivotally engaging the same, means pivotally connecting adjoining end portions of the frames of the weighing platform frames, means operatively connecting the forward end of the rear weighing platform frame with the inner end of said scale beam, and a conveyer extending longitudinally in said casing between the inlet and outlet including an endless belt having its upper flight resting on the platforms.

5. In an apparatus of the character described, a casing having an inlet at its front end and an outlet at its rear end, a platform in said casing between the inlet and the outlet, a conveyer including an endless belt having its upper flight resting on said platform and rollers supporting the belt, one roller being a driving roller carried by a drive shaft having end portions projecting from the roller, and means for scraping material from the lower flight of said belt comprising side boards resting on the bottom of said casing at opposite sides of the conveyor, scrapers pivotally mounted between said side boards with their upper edges engaging the belt and their lower edges resting on the bottom of the casing, fingers extending upwardly from the front ends of said side boards, and cams carried by the projecting end portions of said drive shaft between said fingers for acting on the fingers to impart the reciprocating motion to the side boards during rotation of the drive shaft.

6. In an apparatus of the character described, a casing having an inlet and an outlet spaced therefrom, a conveyer in said casing extending between the inlet and the outlet and including an endless belt and rollers for said belt, a drive shaft carrying one roller, cams carried by said drive shaft, side boards extending longitudinally of said conveyer at sides thereof and having upstanding arms engaging said cams to cause longitudinal shifting of the side boards during rotation of the cams, scrapers pivotally mounted between said side boards and extending transversely of the casing under the conveyer, said scrapers having upstanding blades engaging the under face of the lower flight of said conveyer and depending portions yieldably holding the blades upright and resting on the bottom of the casing, a platform in said casing supporting a portion of the upper flight of said conveyer belt, and means for rotating said drive shaft.

GLEN G. MERCHEN.